(12) United States Patent
Cappiello et al.

(10) Patent No.: US 11,341,730 B2
(45) Date of Patent: May 24, 2022

(54) AUGMENTED REALITY VISUALIZER FOR SWIMMING POOLS

(71) Applicant: Latham Pool Products, Inc., Latham, NY (US)

(72) Inventors: Will Cappiello, Latham, NY (US); Joel Culp, Latham, NY (US); Scott Mocha, Latham, NY (US); Scott Reynolds, Latham, NY (US)

(73) Assignee: Latham Pool Products, Inc., Latham, NY (US)

( * ) Notice: Subject to any disclaimer, the term of this patent is extended or adjusted under 35 U.S.C. 154(b) by 0 days.

(21) Appl. No.: 17/139,797

(22) Filed: Dec. 31, 2020

(65) Prior Publication Data

US 2021/0201589 A1 Jul. 1, 2021

Related U.S. Application Data

(60) Provisional application No. 62/956,255, filed on Jan. 1, 2020.

(51) Int. Cl.
| | |
|---|---|
| *G06T 19/00* | (2011.01) |
| *G06T 7/13* | (2017.01) |
| *G06T 7/70* | (2017.01) |
| *G01S 19/01* | (2010.01) |
| *G06T 7/60* | (2017.01) |
| *G06T 19/20* | (2011.01) |
| *G06Q 30/06* | (2012.01) |

(52) U.S. Cl.
CPC ............ *G06T 19/006* (2013.01); *G01S 19/01* (2013.01); *G06T 7/13* (2017.01); *G06T 7/60* (2013.01); *G06T 7/70* (2017.01); *G06T 19/20* (2013.01); *G06Q 30/0627* (2013.01); *G06T 2200/24* (2013.01); *G06T 2219/2012* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 10,885,701 | B1 * | 1/2021 | Patel | G06T 19/006 |
| 2015/0324940 | A1 * | 11/2015 | Samson | G06Q 10/08 |
| | | | | 705/7.23 |

(Continued)

OTHER PUBLICATIONS

Nehlich , "Vip3D Update: Complete Outdoor Living Design Software is Even Better", Available Online at : https://blog.structurestudios.com/software/best-outdoor-living-design-software-is-even-better-vip3d-update, Aug. 10, 2015, pp. 1-17.

(Continued)

*Primary Examiner* — Jeffrey J Chow
(74) *Attorney, Agent, or Firm* — Kilpatrick Townsend & Stockton LLP

(57) ABSTRACT

An augmented reality visualizer for swimming pools is described herein. In one example, a system can receive images of a target area for a swimming pool from a camera. The system can generate an augmented reality environment by analyzing the images. The augmented reality environment can include a virtual swimming pool overlaying at least one image of the target area. The system can then output the augmented reality environment on a display for viewing by a user.

20 Claims, 4 Drawing Sheets

(56) References Cited

U.S. PATENT DOCUMENTS

| | | | |
|---|---|---|---|
| 2018/0191769 A1* | 7/2018 | Anderson | H04L 63/101 |
| 2019/0242692 A1* | 8/2019 | Saure | G01B 11/24 |
| 2021/0142497 A1* | 5/2021 | Pugh | G06T 7/60 |

OTHER PUBLICATIONS

Nehlich, "YARD: Augmented Reality for Swimming Pools, Outdoor Kitchens, and Hardscapes", Available Online at : https://blog.structurestudios.com/software/yard-augmented-reality-for-swimming-pools-outdoor-kitchens-and-hardscapes, Apr. 25, 2018, pp. 1-17.

Application No. PCT/US2020/067723, International Search Report and Written Opinion, dated Jul. 6, 2021, 21 pages.

Rui et al., "Dynamic Insertion of Virtual Objects in Photographs", International Journal of Creative Interfaces and Computer Graphics, vol. 4, No. 2, Jun. 1, 2013, 18 pages.

Wang et al., "Cut-and-Fold: Automatic 3D modeling from a Single Image", IEEE International Conference on Multimedia and Expo Workshops (ICMEW), Jul. 14-18, 2014, pp. 1-6.

* cited by examiner

AUGMENTED REALITY VISUALIZER FOR SWIMMING POOLS

CROSS-REFERENCE TO RELATED APPLICATIONS

This application claims the benefit of priority under 35 U.S.C. § 119(e) to U.S. Provisional Patent Application No. 62/956,255, filed Jan. 1, 2020, the entirety of which is hereby incorporated by reference herein.

TECHNICAL FIELD

The present disclosure relates generally to swimming pools. More specifically, but not by way of limitation, this disclosure relates to visualizing a swimming pool on a property using augmented reality.

BACKGROUND

Customers generally take into account a variety of considerations when choosing a swimming pool (or "pool") for their property. For example, customers often consider the pool's size, shape, material, lining, and spatial positioning on the property. Customers may also take into account aesthetic considerations, such as the pool's color. Typically, pool manufacturers provide product catalogues that describe their pool products to aid the customer with these considerations. But visualizing what a pool will look like on the property of the customer, and how it will function, still requires a great deal of imagination on the part of the customer.

DETAILED DESCRIPTION

Figure 1:
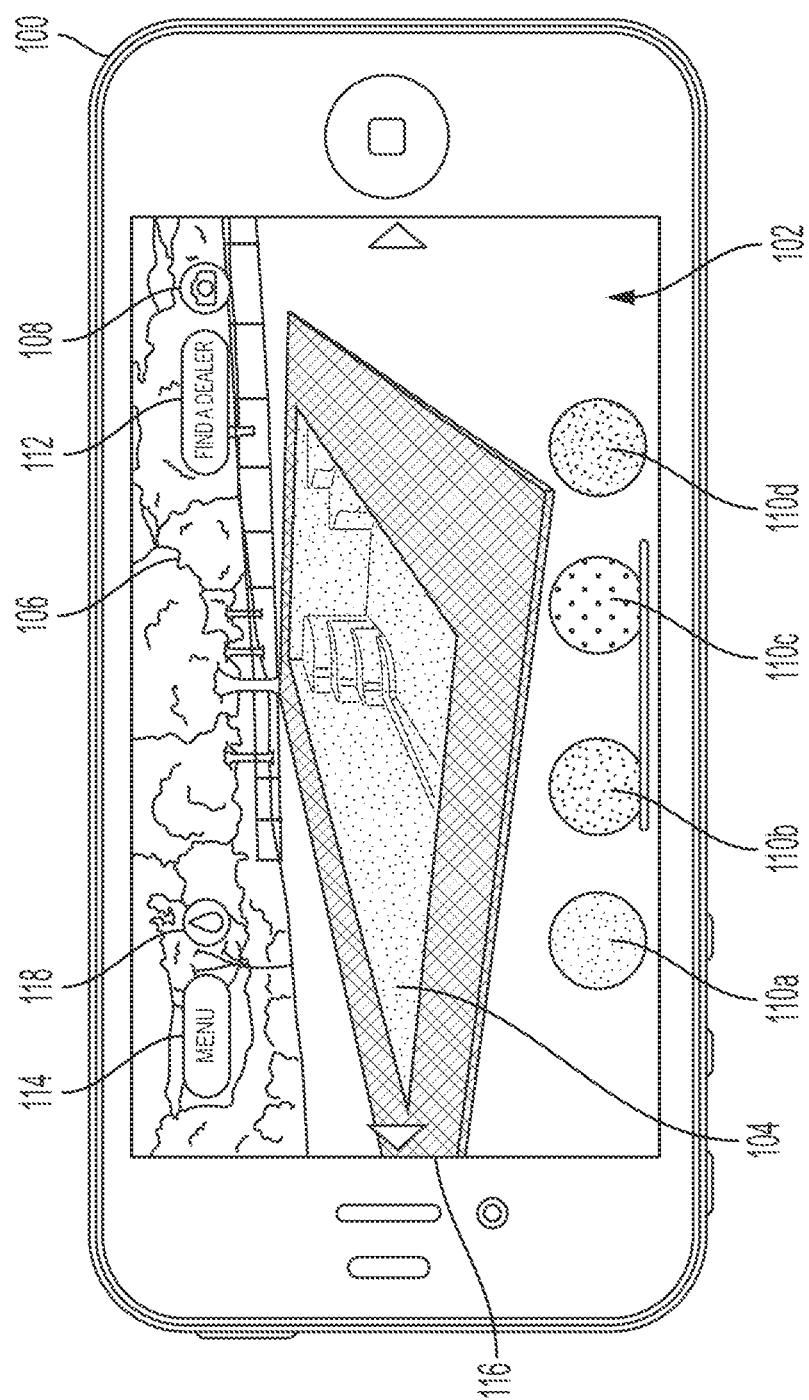
FIGS. 1-2 are screenshots of a pool visualization application according to some aspects of the present disclosure.

Certain aspects and features of the present disclosure relate to visualizing a swimming pool within a target area using augmented reality. In one particular example, a user may wish to install a swimming pool (or "pool") in a target area of a property, such as his backyard or inside his home. To help visualize what the pool would look like in that space, the user can orient a camera of his mobile phone toward the target area and execute a pool visualization application on the mobile phone. The pool visualization application can obtain images of the target area using the camera, generate an augmented reality environment having a virtual swimming pool based on the images, and output the augmented reality environment on a display of the mobile phone. An augmented reality environment is a virtual environment in which images from a camera are supplemented (augmented) with virtual content. In this example, the virtual content is the virtual swimming pool. The augmented reality environment depicts the virtual swimming pool overlaying an image of the target area, to aid the user with visualizing what the swimming pool would look like in that space. This can enable the user to more easily select an appropriate pool.

In some examples, the pool visualization application can provide a variety of customization options through which the user can adjust the look, position, orientation, and other characteristics of the virtual swimming pool. For example, the pool visualization application can enable the user to select a size, shape, material, color, pattern, and/or liner of the virtual swimming pool from among a group of options, to help the user visualize pools with different aesthetic and functional qualities in the target area. The pool visualization application may additionally or alternatively enable the user to adjust a fill state of the virtual swimming pool. The fill state is whether the virtual swimming pool is rendered as an empty pool or filled with virtual water. This can enable the user to get a better sense of what the pool would look like with and without water, which may be important for visualizing how the pool would look in different circumstances.

The pool visualization application may additionally or alternatively enable the user to select the look, position, orientation, and other characteristics of a virtual deck associated with the virtual swimming pool. For example, the pool visualization application can enable the user to select a size, shape, material, color, and texture of the virtual deck from among a group of deck options, to help the user visualize decks with different aesthetic and functional qualities in the target area. As one particular example, the pool visualization application can enable the user to change the color and the texture of a virtual concrete deck (e.g., from a broom finish to a stamped stone) surrounding the virtual swimming pool, as well as expand or reduce the deck area in predefined increments, such as 0.3 meter (m) increments.

In some examples, the pool visualization application can render the virtual swimming pool (and the virtual deck) with one or more shadows to provide a more realistic experience. The pool visualization application can determine the characteristics of the shadows based on a physical location of the user in real space, so that the shadows are rendered to realistically reflect how the user would perceive a real swimming pool from his physical location. For example, the pool visualization application can determine the physical location of the mobile phone in real space using a global positioning system (GPS) unit, where the physical location of the mobile phone can serve as a proxy for the physical location of the user. The pool visualization application can then determine a relative position of the sun in the sky to the physical location of the mobile phone, determine characteristics for one or more shadows based on that relative position, and render the one or more shadows with those characteristics in the augmented reality environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a screenshot of a pool visualization application executing on a handheld device 100 according to some aspects of the present disclosure. In this example, the handheld device 100 is a mobile phone, but in other examples the handheld device 100 may be a tablet, a laptop computer, or an e-reader. The handheld device 100 includes a camera (not shown) positioned on its back surface for capturing images of a target area, from which an augmented reality environment 102 can be generated by the pool visualization application.

As shown in FIG. 1, the pool visualization application has received images 106 from the camera of a target area including a relatively empty field with trees and a fence in the background. From these images, the pool visualization application has generated an augmented reality environment 102, in which a virtual swimming pool 104 has been overlaid onto one or more of the images 106. The augmented reality environment 102 also includes a virtual deck 116 surrounding the virtual swimming pool 104. In this example, the virtual deck 116 is depicted as being a concrete material, but in other examples the virtual deck 116 may be depicted as another type of material. The pool visualization application can render the virtual swimming pool 104 and the virtual deck 116 using a rendering engine, such as Unity 3D.

The pool visualization application can determine characteristics (e.g., a scale, location, and orientation) for the virtual swimming pool 104 and the virtual deck 116 by analyzing the images 106, based on user input, or a combination thereof. For example, the pool visualization application can determine a horizontal plane and a vertical plane in the images 106 by analyzing the images using one or more image-processing algorithms. In one such example, the image-processing algorithms can be supplied by an image-processing library, such as ARKit by Apple®. After determining the horizontal plane, the pool visualization application can set the horizontal plane as ground level. And after determining the vertical plane, the pool visualization application may perform further analysis of the image features in the vertical plane to aid with generating the virtual swimming pool 104 and the virtual deck 116, as detailed below.

As mentioned above, the pool visualization application can perform one or more image-analysis techniques on the image features in the vertical plane. In some examples, the image-analysis techniques can include edge detection. The edge detection algorithm may be supplied by an image-processing library, such as OpenCV®. The pool visualization application can perform the image-analysis techniques to, for example, identify one or more vertical objects (e.g., trees, rocks, fence posts, etc.) extending vertically upward from the ground level. If a vertical object is located in the target area for the swimming pool, the vertical object can be identified as an obstruction that would prevent pool and/or deck placement. Based on identifying such an obstruction, the pool visualization application may output an alert associated with the obstruction and provide an alternative positioning suggestion as to how to reposition or reorient the virtual swimming pool 104 to avoid the obstruction. If a vertical object is located outside the target area for the swimming pool, the pool visualization application may use the vertical object as a visual anchor for calculating the appropriate scale for the virtual swimming pool 104. For example, the pool visualization application can estimate one or more distances from the handheld device 100 to one or more of the visual anchors by analyzing the images 106. The pool visualization application can then use one or more of the estimated distances to determine the appropriate scale for the virtual swimming pool 104 and the virtual deck 116. The pool visualization application can then render the virtual swimming pool 104 and the virtual deck 116 at the determined scale in the augmented reality environment 102.

In some examples, the pool visualization application can render the virtual swimming pool 104 and the virtual deck 116 with one or more shadows to provide a more realistic experience. The pool visualization application can determine the characteristics (e.g., size, shape, angle, and orientation) of the shadows based on a physical location of the handheld device 100 in real space. The physical location can be determined by the handheld device 100 using one or more sensors. Examples of the sensors can include a global positioning system (GPS) unit, gyroscope, accelerometer, or any combination of these. The physical location may include a spatial location of the handheld device 100, an orientation of the handheld device 100, or both of these. After determining the physical location of the handheld device 100, the pool visualization application can determine a relative position of the sun in the sky to the physical location of the handheld device 100. Based on the relative position, the pool visualization application can determine the characteristics for the shadows and render the shadows in the augmented reality environment 102. The pool visualization application can render the shadows by supplying the characteristics to a rendering engine, such as Unity 3D.

The pool visualization application can also provide a graphical user interface (GUI) associated with the augmented reality environment 102. The GUI can enable the user to input a variety of customizations to adjust the aesthetic, functional, and other characteristics of the virtual swimming pool 104 and the virtual deck 116. In the example shown in FIG. 1, the GUI includes a group of liner options 110a-d for the virtual swimming pool 104. A user can select a liner option from among the group of liner options 110a-d and the pool visualization application can responsively update (e.g., modify) the rendering of the virtual swimming pool 104 with the selected liner option. This can enable the user to visualize what a swimming pool would look like in the target area with the selected liner option. The GUI may also include a group of deck options (not shown) for the virtual deck 116. Examples of the deck options can include different sizes, shapes, materials, colors, and textures for the virtual deck 116. A user can select one or more deck options from among the group of deck options, and the pool visualization application can responsively update the rendering of the virtual deck 116 based on the selected deck options. This can enable the user to visualize what a deck with the selected deck options would look like in the target area.

Figure 2:
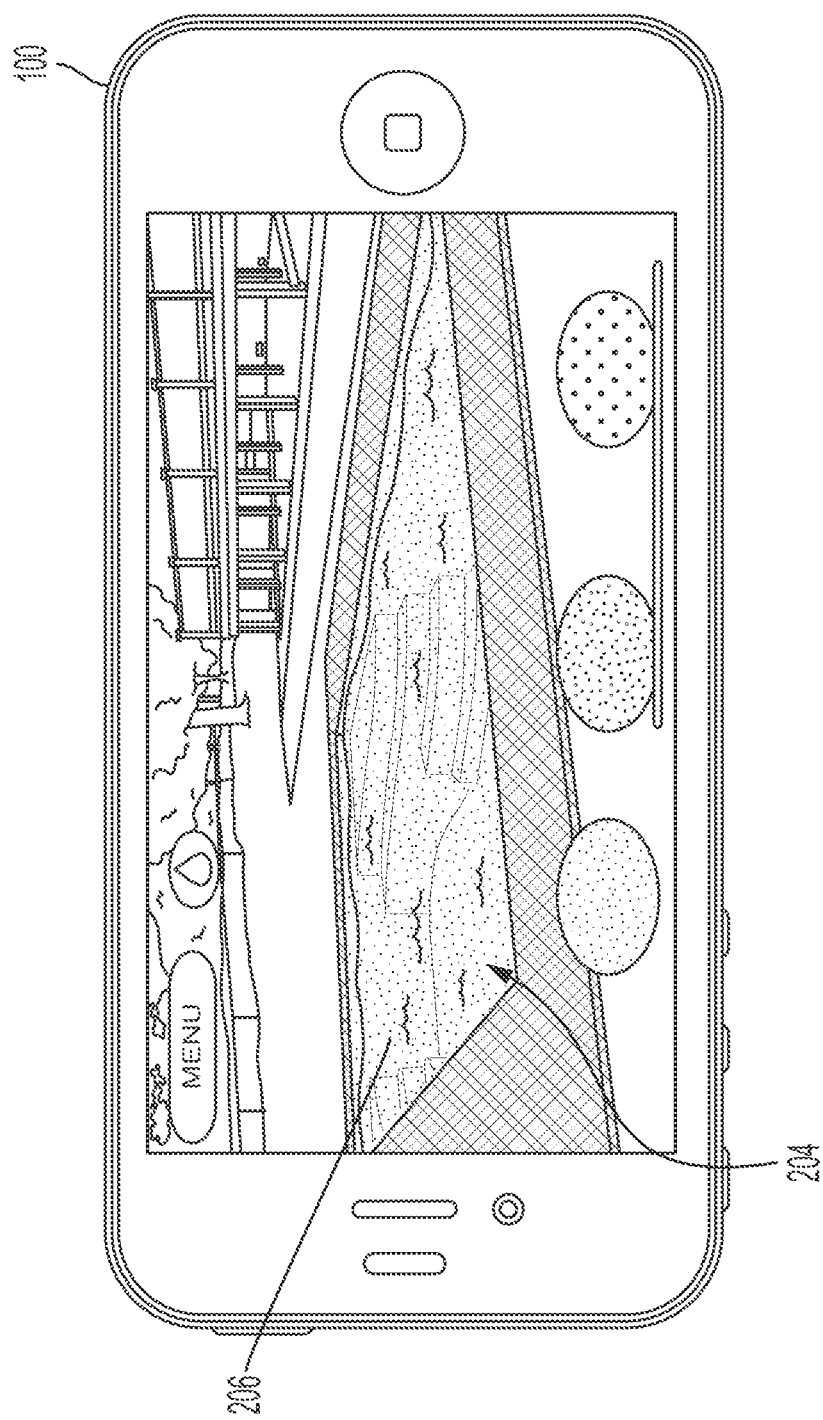

In some examples, the GUI can also include a fill option 118 for adjusting a fill state of the virtual swimming pool 104. In the example shown in FIG. 1, the virtual swimming pool 104 is rendered as an empty pool (without water). If the user wishes to view what the virtual swimming pool 104 would look like filled with water, the user can select the fill option 118 and the pool visualization application will update the rendering of the virtual swimming pool 104 to include virtual water. FIG. 2 depicts one example of a virtual swimming pool 204 as rendered with virtual water 206. While FIGS. 1-2 depict options for certain customizations, these are exemplary and additional or alternative customizations are also possible.

Continuing with FIG. 1, the GUI can also include other user interface objects, such as menu button 114, screenshot button 108, and dealer button 112. The menu button 114 can provide access to other settings and options of the pool visualization application. The screenshot button 108 can enable a user to save an image of the augmented reality environment 102 with the virtual swimming pool 104 and the virtual deck 116. For example, the pool visualization application can detect a user interaction with the screenshot button 108 and responsively capture and store a screenshot image of the augmented reality environment 102 on the handheld device 100. This may enable the user to more easily share the design concept with others (such as a pool dealer or spouse). In some examples, the dealer button 112 can enable the user to find a supplier of swimming pools having the characteristics of the virtual swimming pool 104.

For example, the pool visualization application can detect a user interaction with the dealer button 112 and responsively filter through a list of swimming pool suppliers to identify a group of suppliers that sell pool products with the selected characteristics of the virtual swimming pool 104. The pool visualization application can then filter through the group of suppliers based on their proximity to the user (e.g., based on an address or zip code input by the user, or based on a GPS location of the handheld device 100) to identify to a subset of suppliers within a predefined distance of the user. Of course, in other examples this filtering process can be performed in the opposite order—e.g., by first filtering by proximity and then filtering by product selection. Either way, the pool visualization application can identify appropriate suppliers and output the identified suppliers to the user.

As mentioned above, some examples may intentionally prevent the user from placing a virtual swimming pool 104 in target areas that do not have sufficient space, may alert the user of potential obstructions, and/or may take scaling factors into consideration when presenting the virtual swimming pool 104 and the virtual deck 116 to make the augmented reality environment 102 more realistic. But other examples may intentionally allow for one or more of such rules to be broken. For instance, the pool visualization application may allow a user may disable some of the above restrictions, so that the user can view a virtual swimming pool in smaller spaces where a full-sized version of the swimming pool may not fit. For example, the user can disable some of the above restrictions and then point the camera of the handheld device 100 at a furniture surface, such as the top of a desk or table. In response, the pool visualization application can generate an augmented reality environment having the virtual swimming pool (e.g., at smaller scale) positioned on the furniture surface. This may allow the user to more easily share a pool design concept with a friend or colleague at work, for example. This may also allow users to play with the pool visualization application in a game-like manner, for example, by pointing the camera on their handheld device 100 at a wall or ceiling of a building to project a virtual swimming pool thereon.

While FIG. 1 depicts the pool visualization application executing on a handheld device 100, other examples may involve other types of computing devices. And although the examples above are described with reference to a camera located on the back of the handheld device 100, in other examples the camera may be located elsewhere on the handheld device 100, such as on the front of the handheld device 100.

Figure 3:
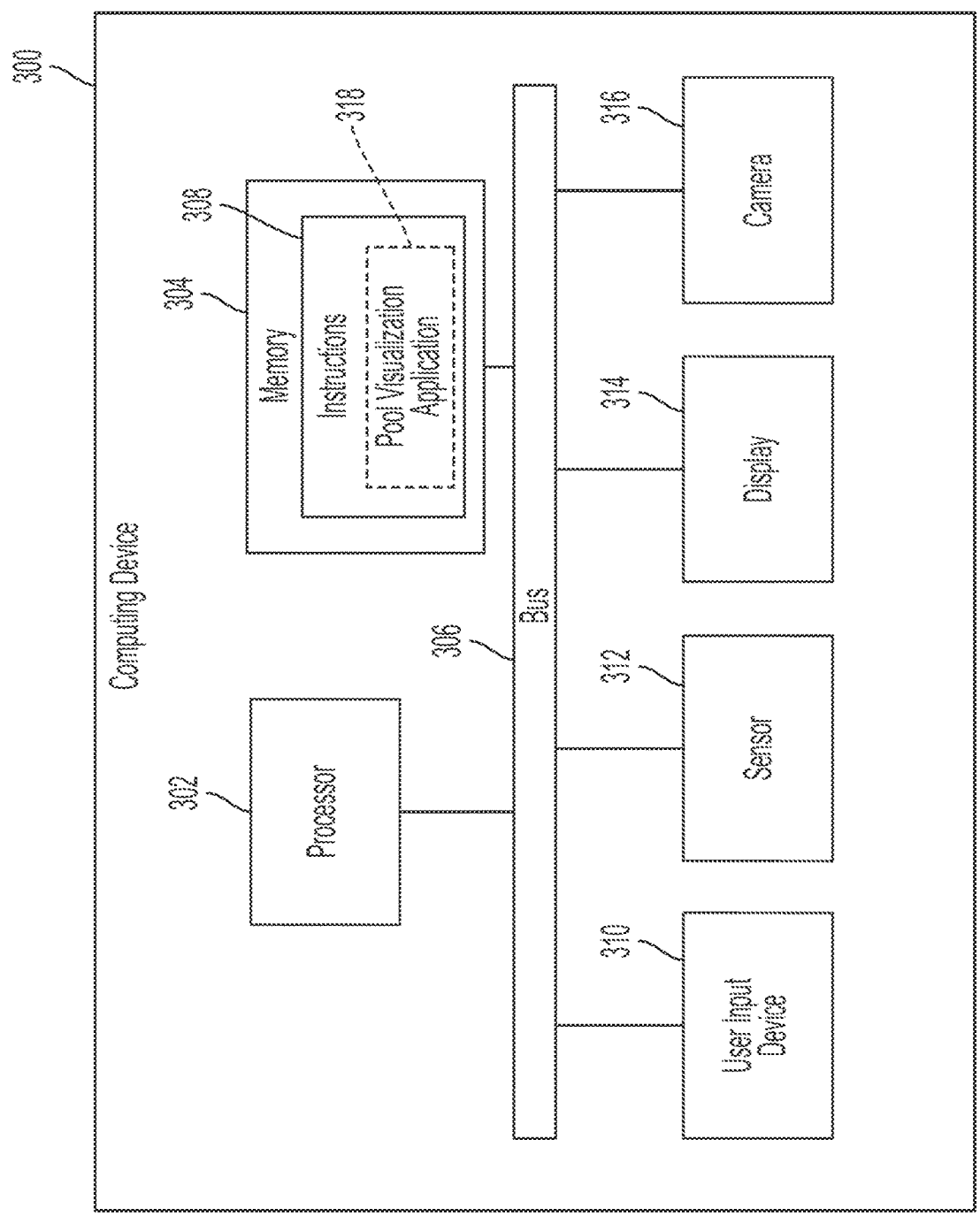
FIG. 3 is a block diagram of an example of a computing device for providing an augmented reality visualizer for swimming pools according to some aspects of the present disclosure.

One example of a computing device 300 for providing an augmented-reality visualizer for swimming pools is depicted in FIG. 3. The computing device 300 can be a handheld device, such as the handheld device 100 of FIG. 1; a wearable device, such as a head-mounted display (HMD) or a watch; or another type of computing device.

The computing device 300 includes a processor 302 communicatively coupled to a memory 304 by a bus 306. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 308 stored in the memory 304 to perform operations. In some examples, the instructions 308 can include processor-specific instructions generated by a compiler or an interpreter from code written in any suitable computer-programming language, such as C, C++, C#, etc.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory device includes a non-transitory computer-readable medium from which the processor 302 can read instructions 308. A non-transitory computer-readable medium can include electronic, optical, magnetic, or other storage devices capable of providing the processor 302 with the instructions 308 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 308.

The instructions 308 can include a pool visualization application 318. The pool visualization application 318 may be executable by the processor 302 for causing the processor 302 to perform any amount and combination of the functionality described herein. The pool visualization application 318 may also be executable by the processor 302 to perform more functionality, less functionality, or different functionality than is described herein.

The computing device 300 also includes input components. One example of an input component is the user input device 310, which may include one user input device or multiple user input devices. Examples of such user input devices can include a mouse, a keyboard, a touchpad, and a touch-screen display. Another example of an input component is the sensor 312, which may include one sensor or multiple sensors. Examples of such sensors can include a global positioning system (GPS) unit, a gyroscope, an accelerometer, and an inclinometer. Yet another example of an input component is a camera 316, which may include one camera or multiple cameras.

The computing device 300 further includes output components. One example of an output component is the display 314, which may include one display or multiple displays. Examples of such displays can include a liquid crystal display (LCD) or a light-emitting diode (LED) display. The computing device 300 may also include an audio output component, like a speaker; a haptic output component, like a haptic actuator; and/or another type of output component. But for simplicity, these other output components are not shown in FIG. 3.

While FIG. 3 depicts the components (e.g., processor 302, display 314, camera 316, etc.) as being internal to a single housing, in other examples the components may be distributed and in wired or wireless communication with one another. For example, the display 314 may be a head-mounted display configured to be positioned on a user's head. In such an example, the head-mounted display may be separate from and in communication with the computing device 300 that performs the main processing. Additionally, although FIG. 3 depicts a certain number and arrangement of components, this is for illustrative purposes and not intended to be limiting. Other examples can include more components, fewer components, different components, or a different arrangement of the components shown in FIG. 3.

Figure 4:
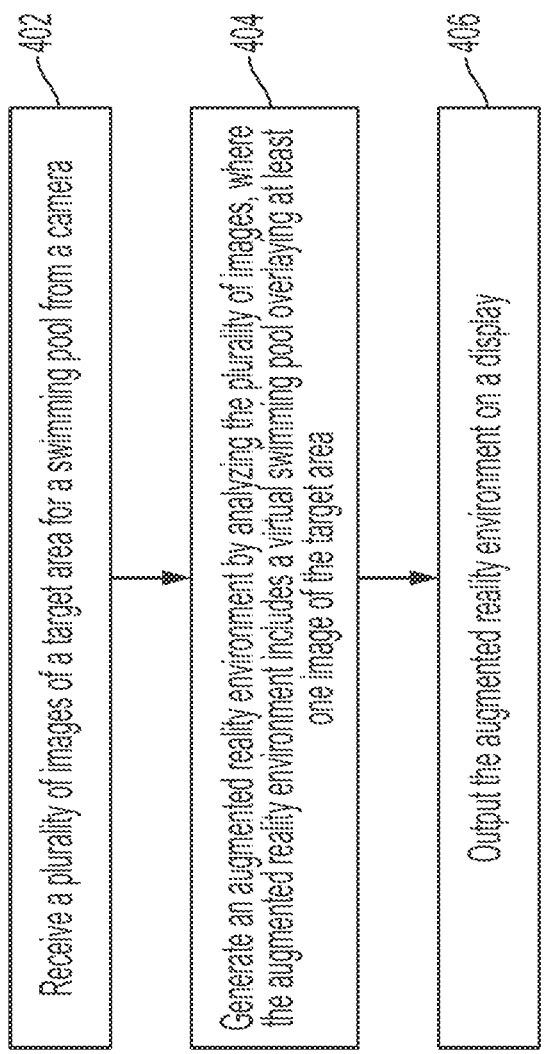
FIG. 4 is a flow chart of an example of a process for providing an augmented reality visualizer for swimming pools according to some aspects of the present disclosure.

FIG. 4 is a flow chart of another example of a process for providing an augmented reality visualizer for swimming pools according to some aspects of the present disclosure. While FIG. 4 depicts a certain sequence of steps for illustrative purposes, other examples can involve more steps, fewer steps, different steps, or a different order of the steps depicted in FIG. 4. The steps of FIG. 4 are described below with reference to components of FIG. 3 described above.

In block 402, the processor 302 receives a plurality of images of a target area for a swimming pool from a camera 316, where the plurality of images depict the target area. The target area can be internal or external to a building, such as a home or commercial space. For example, the target area can be the backyard or lawn of a residential property. Alternatively, the target area can be the interior of a home (e.g., if the swimming pool is going to be an indoor pool).

In block 404, the processor 302 generates an augmented reality environment by analyzing the plurality of images. For example, the processor 302 can determine a horizontal plane and a vertical plane in the plurality of images by analyzing the plurality of images using an image-processing algorithm. The processor 302 can then identify a vertical object existing in the vertical plane and extending vertically upward from the horizontal plane, for example, by performing edge detection on image features in the vertical plane. After identifying the vertical object, the processor 302 can determine a size for the virtual swimming pool in the augmented reality environment by using the vertical object as an indicator of scale. The processor 302 can then generate an augmented reality environment that includes a virtual swimming pool of the determined size, where augmented reality environment depicts the virtual swimming pool overlaying at least one (background) image of the target area. The at least one image can be selected from the plurality of images received from the camera 316. Alternatively, the at least one image can be obtained before or after receiving the plurality of images from the camera 316. In some examples, the processor 302 may also include a virtual deck in the augmented reality environment, e.g., depending on a deck option selected by the user.

In block 406, the processor 302 outputs the augmented reality environment on a display 314. For example, the processor 302 can transmit one or more display signals to the display 314 for causing the display 314 to output the augmented reality environment thereon.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A method comprising:
receiving, by a processor, a plurality of images of a target area for a swimming pool from a camera;
generating, by the processor, an augmented reality environment by analyzing the plurality of images, the augmented reality environment including a virtual swimming pool overlaying at least one image of the target area, wherein generating the augmented reality environment by analyzing the plurality of images involves:
determining a horizontal plane and a vertical plane in the plurality of images by analyzing the plurality of images using an image-processing algorithm;
performing edge detection on image features in the vertical plane to identify a vertical object extending vertically upward from the horizontal plane;
determining a size for the virtual swimming pool in the augmented reality environment by using the vertical object as an indicator of scale; and
depicting the virtual swimming pool in the augmented reality environment as having the size; and
outputting, by the processor, the augmented reality environment on a display.

2. The method of claim 1, further comprising:
identifying, by the processor, an obstruction in the plurality of images that would prevent placement of the swimming pool in the target area; and
in response to identifying the obstruction, outputting, by the processor, an alert associated with the obstruction.

3. The method of claim 1, further comprising:
receiving, by the processor, a user input for modifying a visual characteristic of the virtual swimming pool in the augmented reality environment; and
in response to receiving the user input, modifying, by the processor, the visual characteristic of the virtual swimming pool in the augmented reality environment.

4. The method of claim 3, wherein the visual characteristic includes a size, shape, orientation, material, color, pattern, or liner of the virtual swimming pool.

5. The method of claim 3, wherein the visual characteristic is a fill state, the fill state being whether the virtual swimming pool is depicted as filled with virtual water or empty.

6. The method of claim 1, wherein the processor and the camera are included in a handheld device.

7. The method of claim 6, further comprising:
determining, by the processor, a physical location of the handheld device in real space using one or more sensors;
determining, by the processor, a relative position of the sun to the physical location of the handheld device; and
rendering, by the processor, a shadow associated with the virtual swimming pool in the augmented reality environment based on the relative position of the sun to the physical location of the handheld device.

8. The method of claim 7, wherein the physical location is a geographical location and the one or more sensors include a global positioning system (GPS) unit.

9. The method of claim 1, further comprising:
receiving, by the processor, a user input for identifying a supplier of pool products having one or more visual characteristics of the virtual swimming pool; and
in response to receiving the user input:
filtering, by the processor, through a list of suppliers of pool products to identify one or more suppliers that sell pool products having the one or more visual characteristics of the virtual swimming pool; and
outputting the one or more identified suppliers on the display.

10. The method of claim 1, wherein the augmented reality environment includes a virtual deck associated with the virtual swimming pool, and further comprising:
receiving, by the processor, a user input for modifying a visual characteristic of the virtual deck in the augmented reality environment; and
in response to receiving the user input, modifying, by the processor, the visual characteristic of the virtual deck in the augmented reality environment.

11. The method of claim 10, wherein the visual characteristic includes a size, shape, orientation, material, color, or texture of the virtual deck.

12. A system comprising:
a camera;

a display;
a processor communicatively coupled to the camera and the display; and
a memory including instructions executable by the processor for causing the processor to:
   receive a plurality of images of a target area for a swimming pool from the camera;
   generate an augmented reality environment by analyzing the plurality of images, the augmented reality environment including a virtual swimming pool overlaying at least one image of the target area, wherein generating the augmented reality environment by analyzing the plurality of images involves:
      determining a horizontal plane and a vertical plane in the plurality of images by analyzing the plurality of images using an image-processing algorithm;
      performing edge detection on image features in the vertical plane to identify a vertical object extending vertically upward from the horizontal plane;
      determining a size for the virtual swimming pool in the augmented reality environment by using the vertical object as an indicator of scale; and
      depicting the virtual swimming pool in the augmented reality environment as having the size; and
   output the augmented reality environment on the display.

13. The system of claim 12, wherein the memory further includes instructions that are executable by the processor for causing the processor to:
   identify an obstruction in the plurality of images that would prevent placement of the swimming pool in the target area; and
   in response to identifying the obstruction, output an alert associated with the obstruction.

14. The system of claim 12, wherein the memory further includes instructions that are executable by the processor for causing the processor to:
   receive a user input for modifying a visual characteristic of the virtual swimming pool in the augmented reality environment; and
   in response to receiving the user input, modify the visual characteristic of the virtual swimming pool in the augmented reality environment.

15. The system of claim 12, further comprising one or more sensors, wherein the memory further includes instructions that are executable by the processor for causing the processor to:
   determine a physical location in real space using the one or more sensors;
   determine a relative position of the sun to the physical location; and
   render a shadow associated with the virtual swimming pool in the augmented reality environment based on the relative position of the sun to the physical location.

16. The system of claim 12, wherein the augmented reality environment includes a virtual deck associated with the virtual swimming pool, and wherein the memory further includes instructions that are executable by the processor for causing the processor to:
   receive a user input for modifying a visual characteristic of the virtual deck in the augmented reality environment; and
   in response to receiving the user input, modify the visual characteristic of the virtual deck in the augmented reality environment.

17. A non-transitory computer-readable medium comprising program code that is executable by a processor for causing the processor to:
   receive a plurality of images of a target area for a swimming pool from a camera;
   generate an augmented reality environment by analyzing the plurality of images, the augmented reality environment including a virtual swimming pool overlaying at least one image of the target area, wherein generating the augmented reality environment by analyzing the plurality of images involves:
      determining a horizontal plane and a vertical plane in the plurality of images by analyzing the plurality of images using an image-processing algorithm;
      performing edge detection on image features in the vertical plane to identify a vertical object extending vertically upward from the horizontal plane;
      determining a size for the virtual swimming pool in the augmented reality environment by using the vertical object as an indicator of scale; and
      depicting the virtual swimming pool in the augmented reality environment as having the size; and
   output the augmented reality environment on a display.

18. The non-transitory computer-readable medium of claim 17, further comprising program code that is executable by the processor for causing the processor to:
   identify an obstruction in the plurality of images that would prevent placement of the swimming pool in the target area; and
   in response to identifying the obstruction, output an alert associated with the obstruction.

19. The non-transitory computer-readable medium of claim 17, further comprising program code that is executable by the processor for causing the processor to:
   determine a physical location in real space associated with the processor using one or more sensors;
   determine a relative position of the sun to the physical location; and
   render a shadow associated with the virtual swimming pool in the augmented reality environment based on the relative position of the sun to the physical location.

20. The non-transitory computer-readable medium of claim 17, further comprising program code that is executable by the processor for causing the processor to:
   generate the augmented reality environment to include a visual option that is selectable to toggle the virtual swimming pool between an empty state and a filled state, the empty state depicting the virtual swimming pool without virtual water and the filled state depicting the virtual swimming pool with virtual water.

\* \* \* \* \*